Patented July 15, 1941

2,249,135

UNITED STATES PATENT OFFICE 2,249,135

β,β'-DICYANODIETHYL CYANAMIDE

Ingenuin Hechenbleikner, Stamford, Conn., and Christian Best, Champaign, Ill., assignors to American Cyanamid Company, New York, N. Y., a corporation of Maine No Drawing. Application April 2, 1940, Serial No. 327,458

1 Claim. (Cl. 260—464)

The present invention relates to $\beta,\beta'$-dicyanodiethyl cyanamide.

The above disubstituted cyanamide may be prepared by the reaction between $\beta,\beta'$-dicyanodiethyl amine, cyanogen chloride and caustic soda which may be represented by the equation:

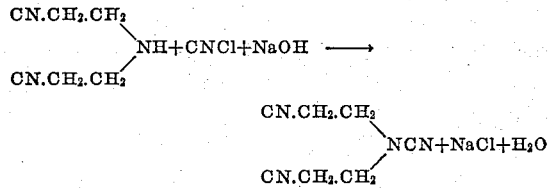

Example 20 grams of $\beta,\beta'$-dicyanodiethyl amine are dissolved in 50 cc. of ether. After cooling the amine solution to about 5° C., a solution of 11 grams of cyanogen chloride dissolved in 50 cc. of ether is gradually added with stirring. When this addition is completed, the mixture is agitated with a solution of 4 grams of sodium hydroxide dissolved in 50 cc. of water and allowed to stand one hour. The ether layer is washed with a small amount of water. The combined water layers are neutralized and saturated with sodium chloride at 0° C. The $\beta,\beta'$-dicyanodiethyl cyanamide separates as a flaky white solid. After recrystallization from alcohol the product has a melting point of 54° C.

This new compound is particularly useful as an intermediate and may be applied to the insecticide and plasticizing arts.

While the invention has been described with particular reference to specific embodiments it is to be understood that it is not to be limited thereto but is to be construed broadly and restricted solely by the scope of the appended claim.

We claim:

As a new compound, $\beta,\beta'$-dicyanodiethyl cyanamide.

INGENUIN HECHENBLEIKNER.
CHRISTIAN BEST.